March 6, 1956 E. V. HARLOW 2,737,258

ELECTRICAL PRECIPITATOR

Filed Jan. 18, 1954 8 Sheets-Sheet 1

INVENTOR.
EARL V. HARLOW.

BY

Ralph B. Buck
his ATTORNEY.

March 6, 1956

E. V. HARLOW 2,737,258

ELECTRICAL PRECIPITATOR

Filed Jan. 18, 1954

8 Sheets-Sheet 2

INVENTOR.
EARL V. HARLOW.

BY Ralph B. Brick
his ATTORNEY.

March 6, 1956 E. V. HARLOW 2,737,258

ELECTRICAL PRECIPITATOR

Filed Jan. 18, 1954 8 Sheets-Sheet 3

INVENTOR.
EARL V. HARLOW

BY

Ralph B. Brick
his ATTORNEY.

INVENTOR.
EARL V. HARLOW.
BY
Ralph G. Brick
his ATTORNEY.

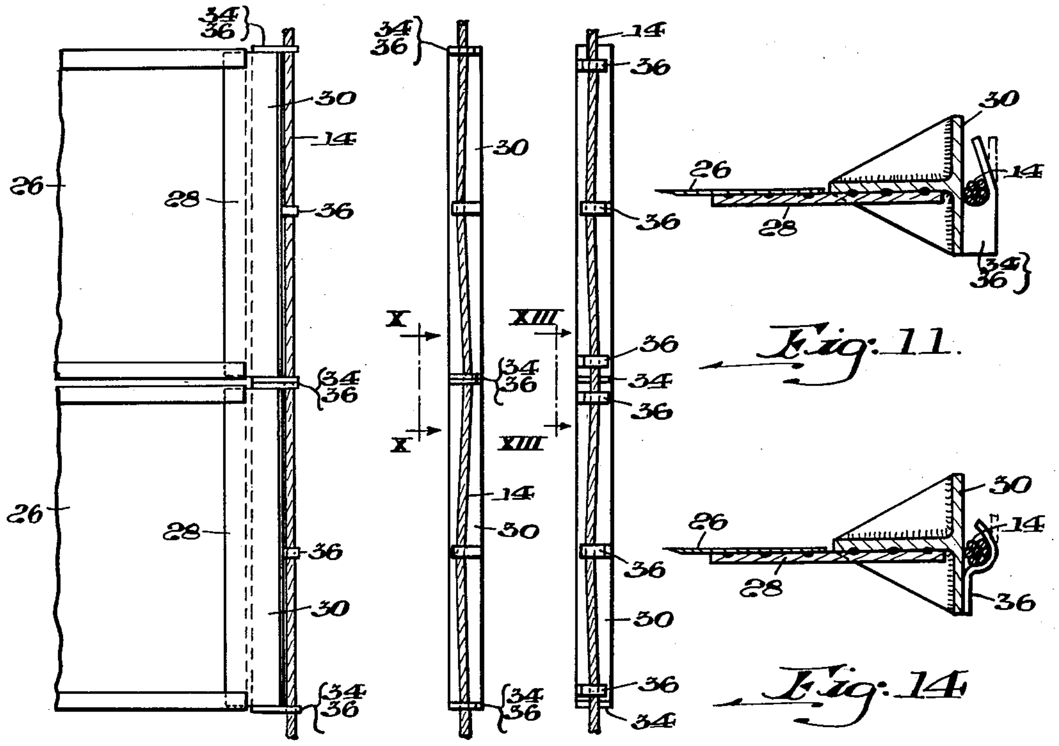
Fig. 11. Fig. 14.
Fig. 8. Fig. 9. Fig. 12.
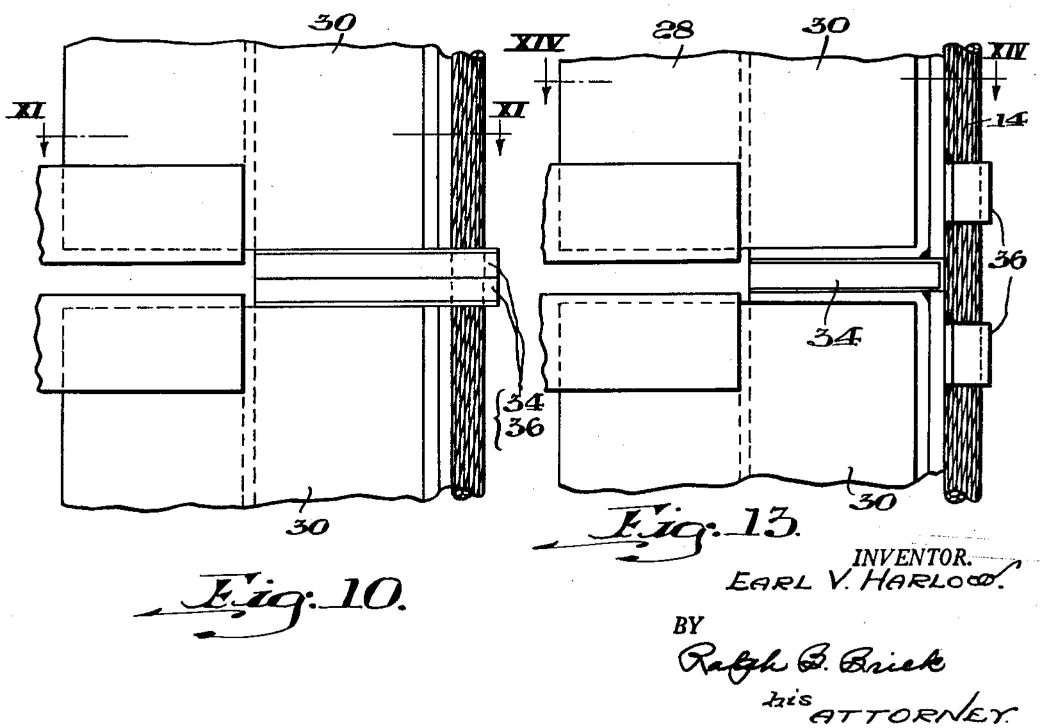
Fig. 13.
Fig. 10.
INVENTOR.
EARL V. HARLOW.
BY
Ralph G. Brick
his ATTORNEY.

ELECTRICAL PRECIPITATOR

INVENTOR.
EARL V. HARLOW.
BY
Ralph B. Brick
his ATTORNEY.

ELECTRICAL PRECIPITATOR

Filed Jan. 18, 1954 8 Sheets-Sheet 7

INVENTOR.
EARL V. HARLOW
BY
Ralph A. Brick
his ATTORNEY

March 6, 1956 E. V. HARLOW 2,737,258

ELECTRICAL PRECIPITATOR

Filed Jan. 18, 1954 8 Sheets-Sheet 8

INVENTOR.
EARL V. HARLOW
BY
Ralph B. Brick
his ATTORNEY.

2,737,258
Patented Mar. 6, 1956

2,737,258

ELECTRICAL PRECIPITATOR

Earl V. Harlow, Towson, Md., assignor to Koppers Company, Inc., a corporation of Delaware Application January 18, 1954, Serial No. 404,614
11 Claims. (Cl. 183—7)

The present invention relates to electrical precipitators and more particularly to electrode structure for use therein.

As steam generating plants, open-hearth furnaces and other industrial units have increased in size, it has become necessary to increase the size of the electrical precipitators which are utilized with these units to remove the fly ash or dust from effluent gases. Large precipitators require large-sized electrode structures and this creates additional problems, since it is more difficult to support the weight of such electrode structures, maintain them in fixed spaced relationship, and yet avoid having the supporting structure interfere with the gas flow in the precipitator chamber.

One of the features of the present invention is to provide a collecting electrode structure in which a substantially unlimited area can be maintained in one plane.

Another feature of the present invention is to provide a collecting electrode structure which is light in weight, making it readily susceptible to rapping operations.

Another feature of the present invention is to provide a collecting electrode structure which is simple in its construction and maintenance and efficient in its operation.

Another feature of the present invention is to provide a collecting electrode structure that can be simply and quickly assembled.

Another feature of the present invention is to provide a collecting electrode structure wherein a substantially constant tension is maintained on the collecting electrode units.

Still another feature of the present invention is to provide a collecting electrode structure which minimizes undesirable features of warping due to welding, machining and handling.

Still another feature of the present invention is to provide a collecting electrode structure wherein more effective electrical contact is obtained.

More particularly, the present invention provides in an electrical precipitator having a precipitating chamber with a plurality of parallel spaced vertical discharge electrode units therein, a collecting electrode structure comprising a plurality of parallel spaced vertical collecting electrode units so arranged that each of said discharge electrode units is positioned substantially parallel to adjacent collecting electrode units; a plurality of parallel, vertical, flexible tension members extending between the upper and lower portion of said precipitating chamber adjacent to and along opposite vertical edges of each of said collecting electrode units; connection means adapted to connect each of said collecting unit vertical edges to said tension member adjacent thereto; and tensioning means adapted to hold said flexible members in tension whereby said collecting units connected thereto are maintained in parallel relationship.

It will be obvious to one skilled in the art to which this invention pertains that various changes can be made in the arrangement, form, construction and type of the various elements disclosed without departing from the scope or spirit of this invention.

Reference will now be made to the accompanying drawings which illustrate and exemplify an embodiment of the invention in a preferred type of construction.

Figure 8 represents an enlarged view of a portion of a collecting electrode unit with hooks, forming part of the bearing plates, used as connecting means to connect the electrode units to the cable.

Figure 9 represents a side view of Figure 8.

Figure 10 represents an enlarged cross-sectional view taken on the line X—X of Figure 9.

Figure 11 represents horizontal cross-sectional view taken along the line XI—XI of Figure 10.

Figure 12 represents a side view of a collecting electrode with hooks used as connecting means to connect the electrode units to the tensioned cable and bearing plates being separate units.

Figure 13 represents an enlarged cross-sectional view taken on the line XIII—XIII of Figure 12.

Figure 14 represents a horizontal cross-sectional view taken along the line XIV—XIV of Figure 13.

Figure 1:
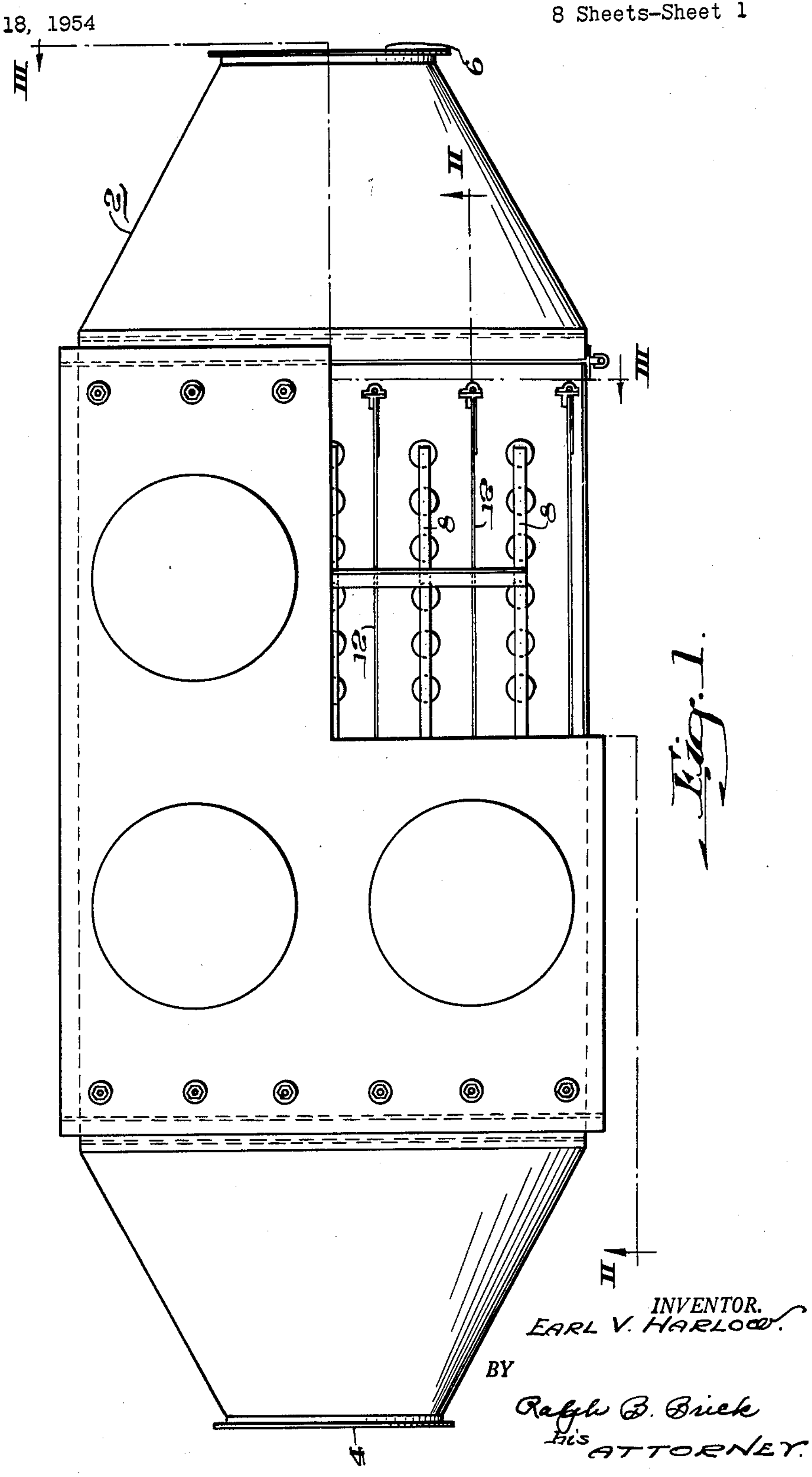
Figure 1 represents a top plan view of the precipitating chamber with a portion of the roof removed to expose the electrodes.
Figure 2:
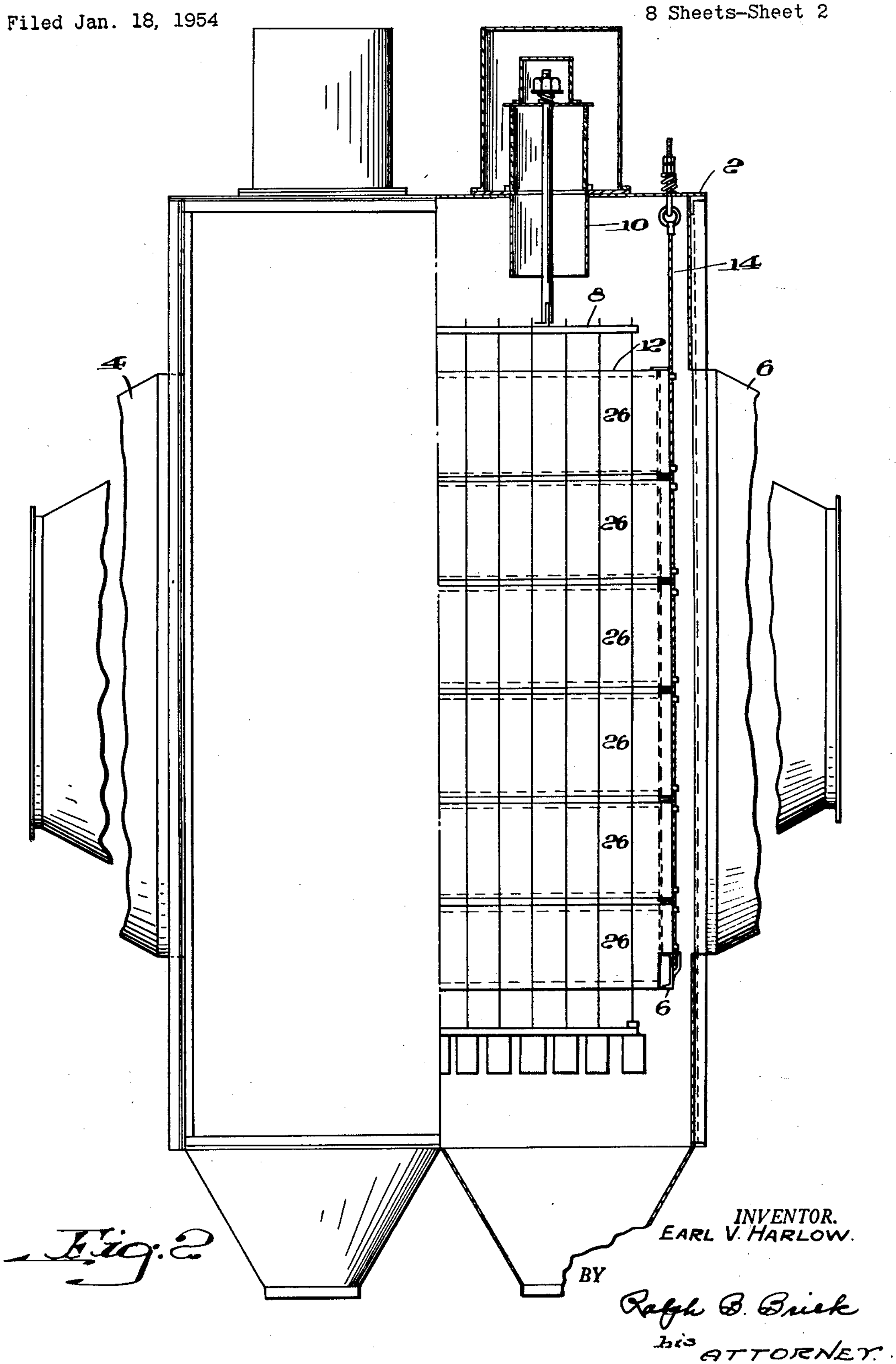
Figure 2 represents a side elevational view of the precipitating chamber of Figure 1 taken along the line II—II of Figure 1.
Figure 3:
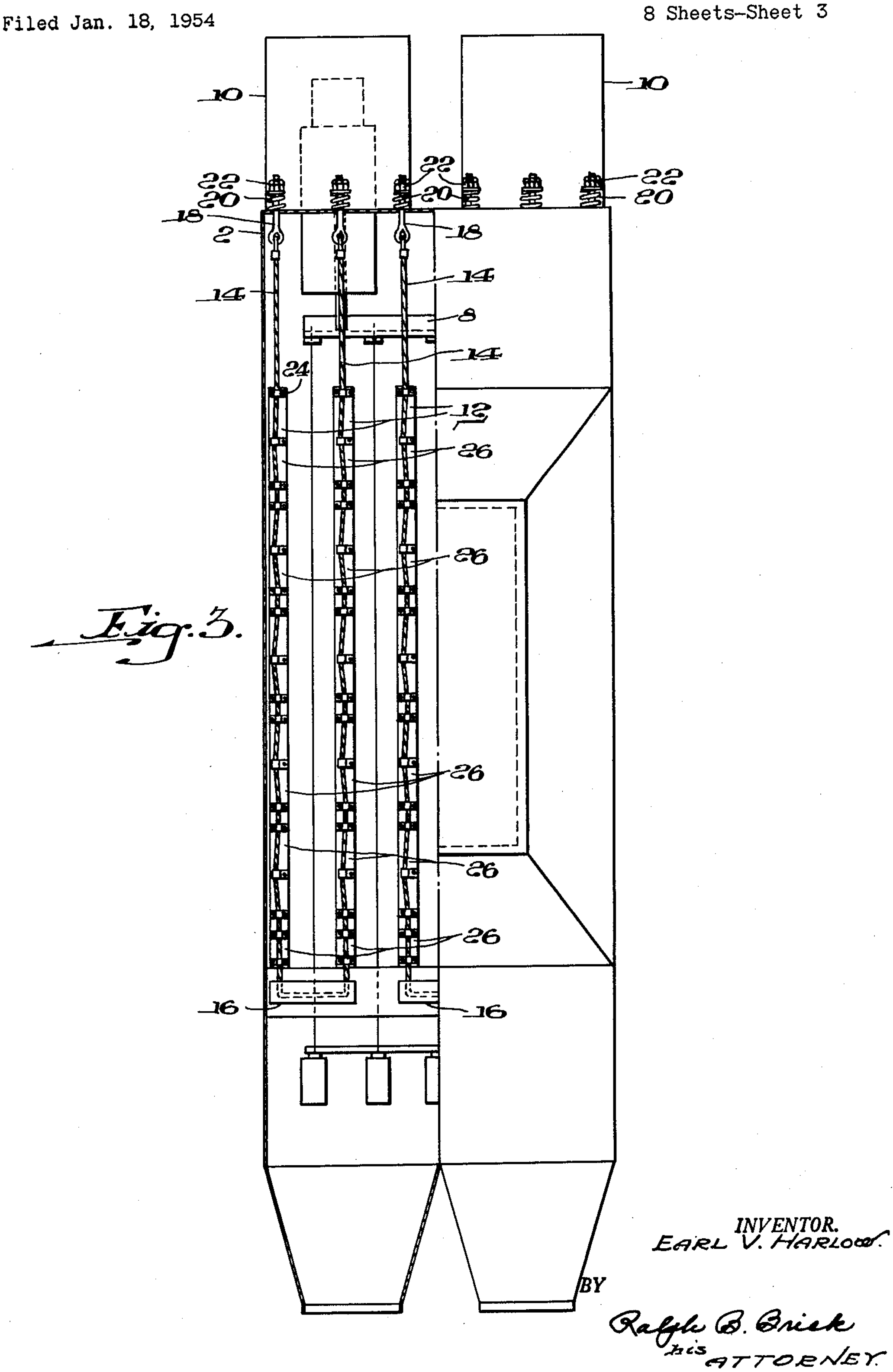
Figure 3 represents a front elevational view of the precipitating chamber of Figure 1 taken along the line III—III of Figure 1.
Figure 4:
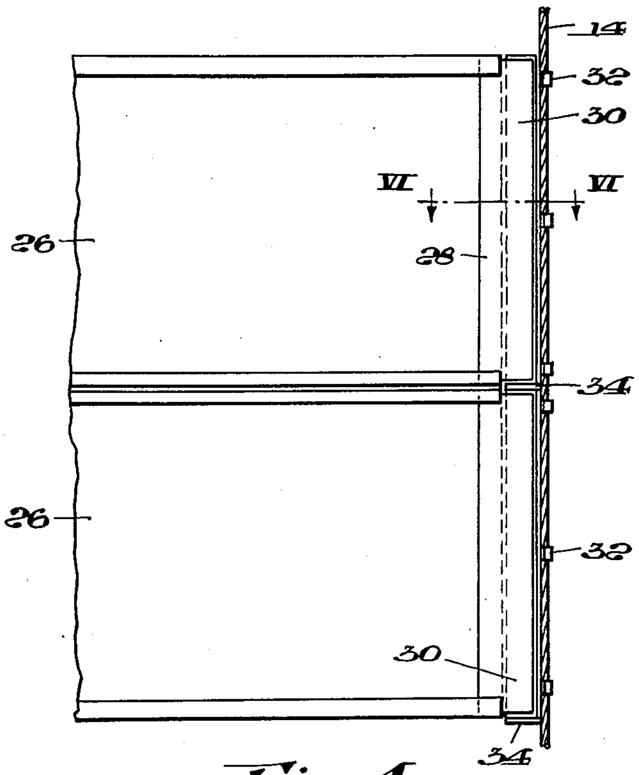
Figure 4 represents an enlarged view of a portion of a collecting electrode unit.
Figure 5:
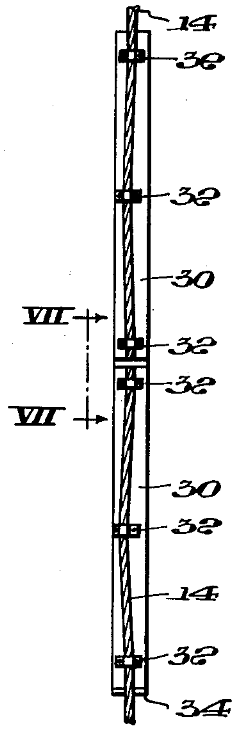
Figure 5 represents a side view of the apparatus disclosed in Figure 4.

As shown in Figure 1–3 of the drawings, an electrical precipitator chamber 2, having gas inlet 4 and gas outlet 6 has mounted therein a plurality of parallel spaced vertical discharge units 8, which are suspended from the upper portion of the chamber 2 by the suspension assembly 10. The suspension assembly is well-known in the art and, therefore, not described in detail herein. It will be obvious to one skilled in the art that various changes can be made in the type of discharge units and suspension assembly used without departing from the present invention.

A collecting electrode structure comprising a plurality of parallel spaced vertical collecting electrode units 12 is so arranged in the precipitating chamber 2 that each of said discharge electrode units 8 is positioned substantially parallel to adjacent collecting electrode units. The collecting electrode units are maintained in vertical position by means of flexible stranded cables or tension members 14. Although in an advantageous embodiment of the invention, stranded cables 14 are used, it is to be understood that other tension members can be used, such as straps, chains, belts or linkages of various design.

The cables 14, as shown in Figure 3, assume the form of a hairpin loop, looped around the retainers or cable guides 16 which are fixed to parallel supporting beams 6. The beams 6 are fixed to the lower portion of precipitating chamber 2, their longitudinal axes being in a direction substantially perpendicular to the planes of said collecting electrode units 12.

The cables 14 run alongside and adjacent the vertical edges of each collecting unit 12, and the ends of each cable are attached to eyebolts 18, which pass through the upper portion of precipitating chamber 2. Coil springs 20 are fitted over the shank of each eyebolt to press against nut and washer assemblies 22, threaded on the ends of each bolt. This arrangement places cables 14 under tension and eliminates two of the four cable connections which would be required if both ends of two independent strands were attached. It is preferable to place the springs 20 on top of the precipitating chamber rather than at the bottom end of the cables because at the bottom they would be inside the precipitator and the high temperature inside many precipitators could destroy the elasticity of the springs. By turning the nut assemblies 22 on bolts 18, the tension on the cables 14 can be adjusted within limits. In an advantageous embodiment of the invention, the cables are maintained under about 1000 pounds to 2000 pounds tension.

Connection members, which are disclosed in Figure 3 as vertically spaced brackets 24, are fixed to each of the vertical edges of the collecting electrode units 12, each embracing the cable 14 running alongside the collecting unit. These connection members can be constructed so as to slide freely on the cables 14, the weight of the collecting electrode units being carried on the beams 6 at the bottom of the precipitating chamber 2, there being no disadvantage in maintaining tension in the cables by means of springs 20, positioned on top of, and outside the chamber.

In another embodiment of the invention, however, the connection members can be clamped to the cable to prevent sliding. In this event, the dead weight of the electrode units plus the collected dust would be supported by the springs and a tensioning device which applies tension through the weights positioned at the bottom of each collecting electrode unit would be preferable. Such a device is disclosed in co-filed application Serial No. 404,615.

It is to be noted, as disclosed in Figure 3, that instead of using one continuous sheet of material, each of the collecting electrode units 12 can be divided into a plurality of spaced collecting electrode panels 26 positioned one above the other in a substantially common plane (see Figure 2). By providing separate panels, erection costs and erection time are greatly reduced and problems of warping which accompany the use of one continuous unit are greatly minimized. Further, the use of separate panels renders the collecting electrodes more sensitive to light rapping blows.

When the connection members slidably engage adjacent cables 14, the panels of each unit are supported one upon another and the lowest is supported on horizontal beams 6.

In Figure 3, brackets 24 are vertically spaced on the vertical edges of each panel 26, the middle bracket on each panel edge being horizontally offset from the other two brackets on the edge. The purpose of this offset will be described hereinafter.

To facilitate ranging or jarring dust from the electrode panels, it is desirable to use very thin metal sheet for the major part of the electrode area, a thickness of about 0.020 inch being appropriate in cases in which corrosion is not severe. However, the thin electrode panel must have suitable members mounted thereon at opposite vertical edges for connection to the cable or other tension member running alongside and adjacent thereto. Figures 4–30 disclose various modifications of electrode panels and connection members fixed thereto for connecting the panels to the tensioned members.

Figure 6:
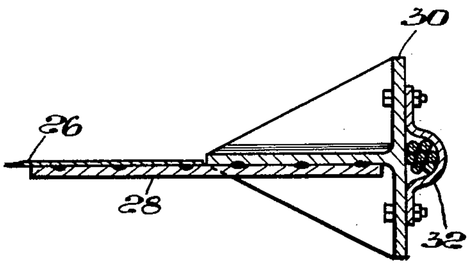
Figure 6 represents a cross-sectional view of the apparatus of Figure 4 taken on the line VI—VI.
Figure 7:
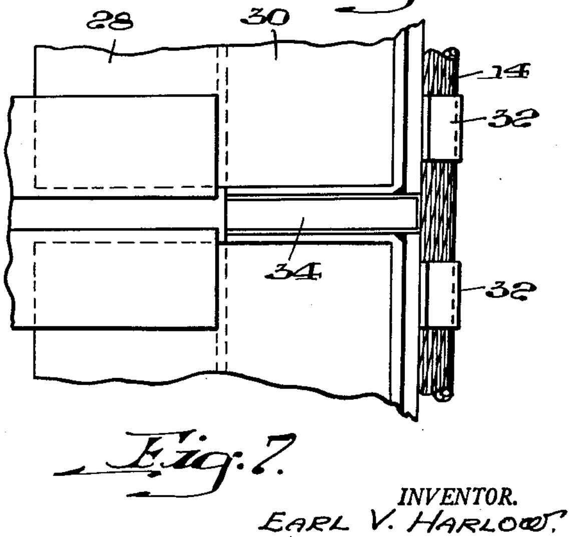
Figure 7 represents an enlarged view of the apparatus of Figure 5 taken on the line VII—VII.
Figure 15:
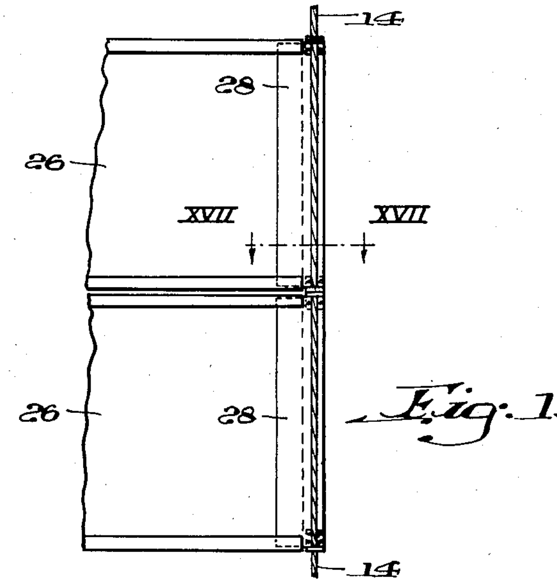
Figure 15 represents an enlarged view of a portion of a collecting electrode unit, the collecting electrode unit being clamped to the tension member by means of a bracket.
Figure 16:
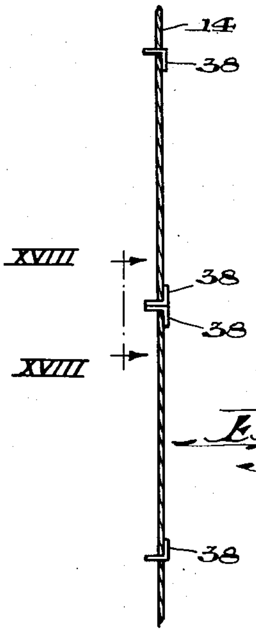
Figure 16 represents a side view of Figure 15.
Figure 17:
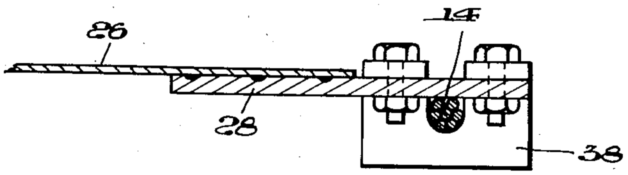
Figure 17 represents a horizontal cross-sectional view of a portion of Figure 15 taken along the line XVII—XVII of Figure 15.
Figure 18:
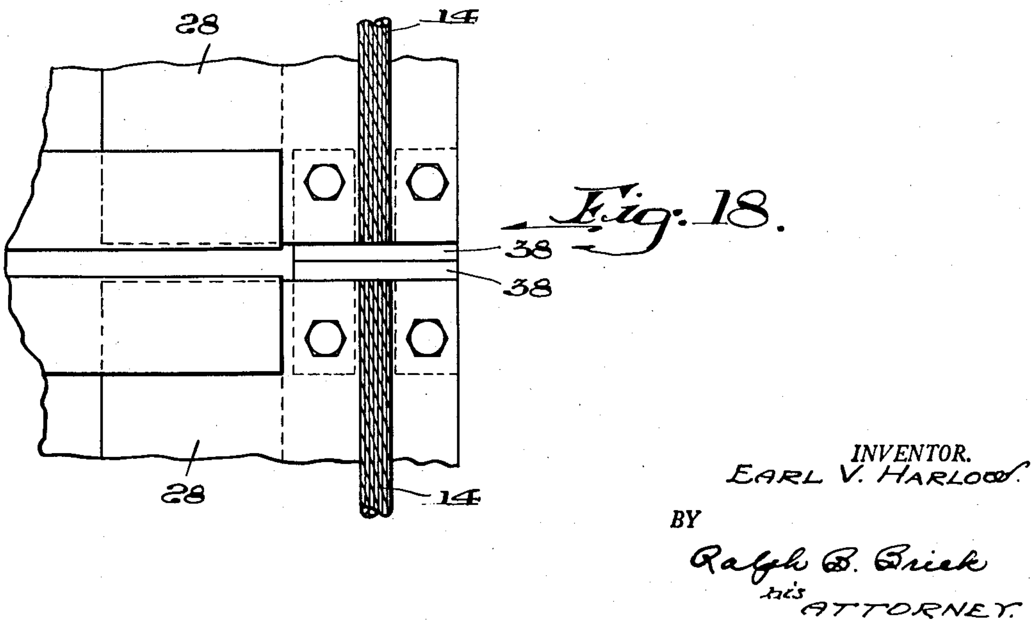
Figure 18 represents an enlarged view taken on the line XVIII—XVIII of Figure 16.
Figures 19, 20, 21, 22, 23, 24, 25, 26:
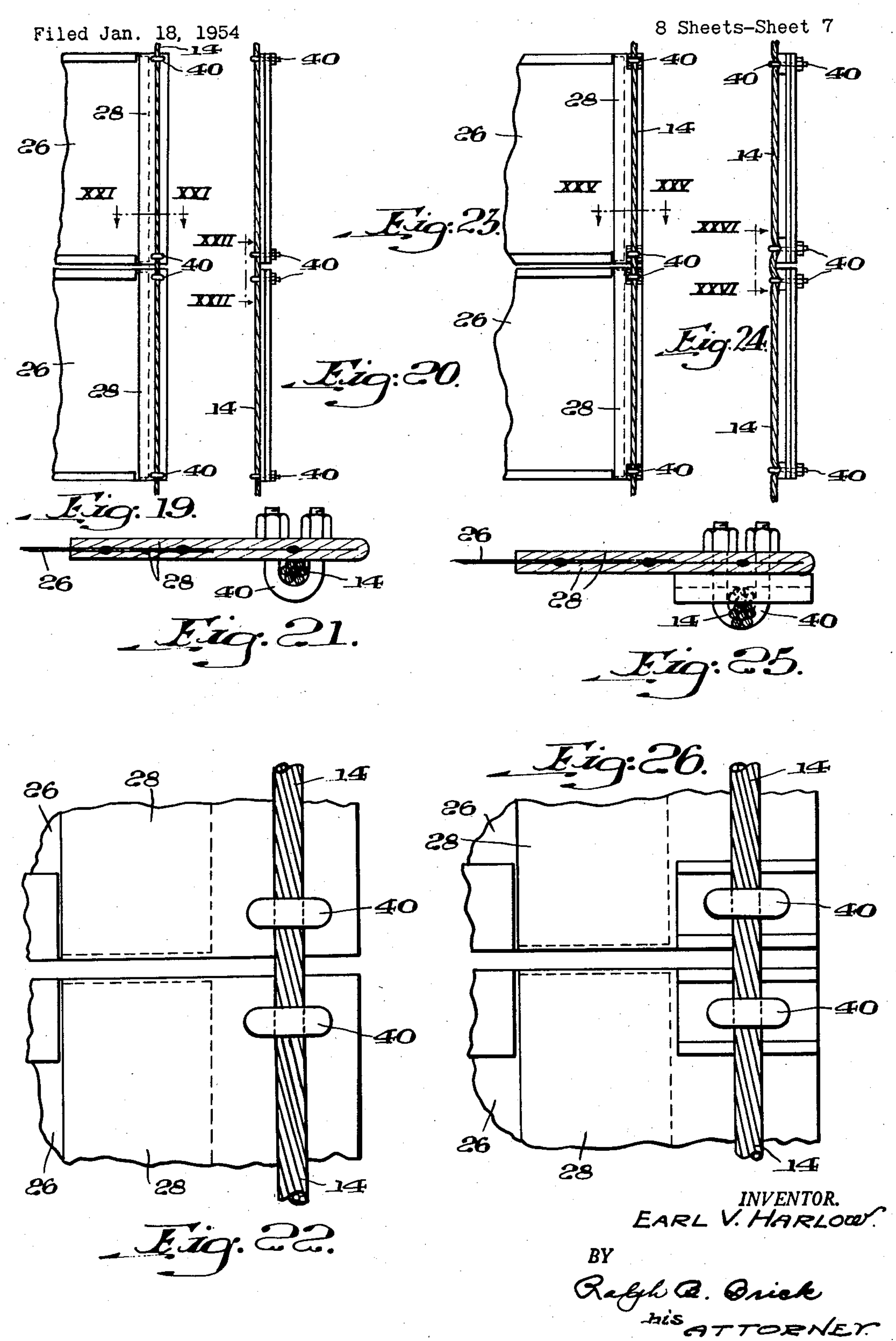
Figure 19 represents an enlarged view of a portion of a collecting electrode unit, the unit being slideably connected to the tension member by means of a U-bolt.
Figure 20 represents a side view of Figure 19.
Figure 21 represents an enlarged horizontal cross-sectional view of a portion of collecting electrode along the line XXI—XXI of Figure 19.
Figure 22 represents an enlarged view of a portion of a collecting electrode unit taken along the line XXII—XXII of Figure 20.
Figure 23 represents an enlarged view of a portion of a collecting electrode unit, the unit being clamped non-slideably (or fixedly) to the tension member by means of U-bolts.
Figure 24 represents a side view of Figure 23.
Figure 25 represents an enlarged horizontal cross-sectional view of a portion of a collecting electrode taken along the line XXV—XXV of Figure 23.
Figure 26 represents an enlarged view of a portion of a collecting electrode unit taken along the line XXVI—XXVI of Figure 24.
Figure 27:
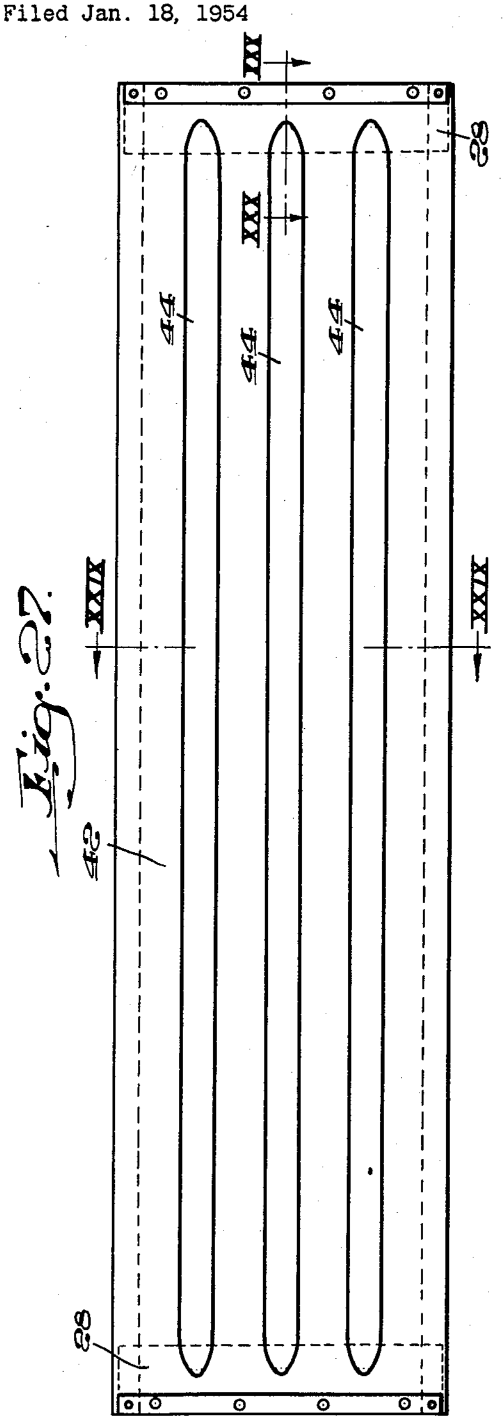
Figure 27 represents an enlarged view of an electrode panel having indentations therein for rigidity.
Figure 30:
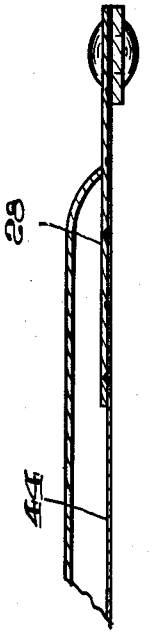
Figure 30 represents a sectional view of Figure 27 taken on the line XXX—XXX.
Figure 29:
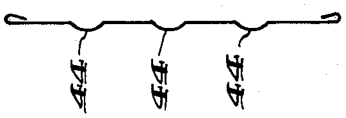
Figure 29 represents a sectional view of Figure 27 taken on the line XXIX—XXIX.
Figure 28:
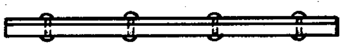
Figure 28 represents a side view of Figure 27.

In Figures 4–7, each panel 26 is reinforced at its vertical edges with somewhat thicker reinforcing strips 28, connected to the panel, for example, by spot welding, as shown in Figure 6. Welded to the strips 28, in turn, are the stems of T sections 30, to the base of which T sections are fastened, the connecting means or brackets 32. In this advantageous embodiment of the invention, the brackets are shown to be in slideable engagement with the cables 14, and bearing plates 34 are welded to the bottom end of each T section to provide a bearing surface when one plate rests upon another. Brackets of any desired area of contact can be selected, the brackets preventing the electrode panels from falling away from the cables 14 when tension in the cable is relaxed.

It is to be noted that three brackets are provided on each T section. The top and bottom brackets are centered on the base of the T section but the bracket midway between the top and bottom brackets is slightly offset, so that a bend is created in the cable passing therethrough. As the cable tends to straighten under tension, it bears against the sides of the bracket which embraces it, producing a firm contact and a good electrical connection.

Figures 8–14 disclose panel members similar to those disclosed in Figures 4–7, only in these figures, hooks 36 instead of brackets 32, are used to permit rapid assemblage of the structure. As disclosed in Figures 8–11, three hooks are provided for each vertical edge, the middle hook being offset horizontally and of opposite hand to create a bend in cable 14, thus insuring firm contact and a good electrical connection. As shown in Figures 8–11, the top and bottom hooks can be formed from an extension of the bearing plates 34, which are welded to the end member in order to provide bearing surfaces between contiguous electrode panels. However, as shown in Figures 12–14, it may be desirable to make top and bottom hooks 36 separate from bearing plates 34, and directly weld them to the end member, as at the middle position, to obtain more bearing area on the cable 14, thereby eliminating concentration of abrasion and burning on a short section of the cable.

It also is to be noted that a combination of hooks and clamps, such as hooks at the top and bottom of the T section base and a bolted clamp at the middle, can be used, the middle clamp being offset to prevent chattering on the cables and giving good electrical contact as in the case of hooks.

Figures 15–18, disclose panel members similar to those disclosed in Figures 4–7, only in these figures, the panels are attached to the cables 14 by brackets 38 and the T sections and bearing plates are eliminated. The brackets perform three functions, namely: they attach the reinforcing plates 28 of the electrode panels 26 to the tensioned cables 14; they provide a bearing surface to support each panel upon the panel below and the lowest on the supporting beams 6; and, they space the electrode panels so that the rolled beads of the panels do not interfere.

Figures 19–26 disclose a simple structure which can be used to connect the electrode panels 26 to the cables 14. In these figures, U-bolts 40 are disclosed, Figures 19–22 disclosing a slideable connection with the cable 14 and Figures 23–26 disclosing a clamping connection. In both instances, reinforcing plates 28 are provided on either side of the panel 26 and T sections 30 are eliminated.

Figures 27–30 disclose a collecting electrode panel 42 having a plurality of indentations 44 therein which gives the panel added rigidity. The panel is provided with reinforcing strips 28.

Finally, it is to be noted that the inventive features disclosed herein can be applied to the discharge electrodes as well as to the collecting electrodes of an electrical precipitator.

The invention claimed is:

1. In an electrical precipitator having a precipitating chamber with a plurality of parallel spaced vertical discharge electrode units therein, a collecting electrode structure comprising a plurality of parallel spaced vertical planar collecting electrode units so arranged that each of said discharge electrode units is positioned substantially parallel to adjacent collecting electrode units each of said collecting units being divided into a plurality of collecting electrode panels positioned one above the other in a substantially common plane; a plurality of parallel flexible vertical tension members extending between the upper and lower portion of said precipitating chamber adjacent to and along opposite vertical edges of each of said planar collecting electrode units, said flexible tension members comprising a plurality of panel supporting straps, each in the form of a hairpin loop, the legs of each of said loops extending along and being connected to corresponding vertical edges of adjacent pairs of collecting electrode panels, the ends of each leg at the open end of said loop being fastened at one vertical end of said precipitator chamber to said tensioning means; and a plurality of strap guide means positioned at the opposite vertical end of said precipitator chamber adapted to receive and guide the closed end of each of said hairpin loops.

2. The apparatus of claim 1, said tensioning means comprising a plurality of spring members fixed to at least one end of each of said flexible members and adapted to place said flexible members under tension.

3. The apparatus of claim 1, said connection means comprising a plurality of clamping devices fixed to the vertical edges of each of said collecting electrode units and each clamped in firm engagement with said adjacent flexible member, whereby each unit is supported individually by the flexible members extending adjacent its vertical edges.

4. The apparatus of claim 1, said connection means comprising a plurality of brackets fixed to the vertical edges of each of said collecting electrode units, each bracket slidably embracing said adjacent flexible members, a pair of spaced horizontal and supporting beams in the lower portion of said precipitator chamber running substantially perpendicular to said collecting electrode units and positioned thereunder whereby said units are supported.

5. In an electrical precipitator having a precipitating chamber with a plurality of parallel spaced vertical discharge electrode units therein, a collecting electrode structure comprising a plurality of parallel spaced vertical collecting electrode units so arranged that each of said discharge electrode units is positioned substantially parallel to and between adjacent collecting electrode units, each of said collecting units being divided into a plurality of collecting electrode panels positioned one above the other in a substantially common plane; a plurality of parallel flexible vertical tension members extending between the upper and lower portion of said precipitator chambers adjacent to and along the vertical edges of each of said collecting units; a plurality of brackets fixed to the vertical edges of each of said collecting electrode panels, each bracket slidably engaging with said adjacent flexible member; a pair of spaced horizontal supporting beams in the lower portion of said precipitator chamber running substantially perpendicular to said collecting units and positioned under the lowest panel of each unit whereby the panels of each unit are supported one upon another and the lowest is supported on said horizontal beam; and tensioning means adapted to hold said flexible members in tension whereby said units slidably connected thereto are maintained in parallel relationship.

6. The apparatus of claim 5, each of said panels having vertical reinforcing members fixed to each of its vertical edges, said brackets being fixed to said reinforcing members.

7. The apparatus of claim 5, each of said panel vertical edges having at least one group of three brackets vertically spaced thereon, the middle bracket being horizontally offset from its adjacent brackets forming a bend in the vertical tension member to which said group is attached and thereby effecting a firm contact.

8. The apparatus of claim 5, each of said brackets being in the shape of an open-end hook.

9. The apparatus of claim 5, each of said brackets being in the shape of a U-bolt, with the legs attached to the vertical edges of said panel.

10. The apparatus of claim 5 and bearing plates fixed to the lower end of each panel.

11. The apparatus of claim 5, said panels having indentations therein to increase rigidity.

References Cited in the file of this patent

UNITED STATES PATENTS

| | | |
|---|---|---|
| 2,625,238 | Roper | Jan. 13, 1953 |

FOREIGN PATENTS

| | | |
|---|---|---|
| 174,995 | Great Britain | Feb. 15, 1922 |
| 562,043 | Great Britain | June 15, 1944 |